May 21, 1963 R. J. HOTCHKISS, JR 3,090,448
COMBINATION WHEEL-MOUNTED DISC HARROW AND TOOTH
DRAG ATTACHMENT WITH TENSION MEANS THEREFOR
Filed Jan. 26, 1960 4 Sheets-Sheet 1

INVENTOR.
ROBERT J. HOTCHKISS JR.
BY
McMorrow, Berman & Davidson
ATTORNEYS

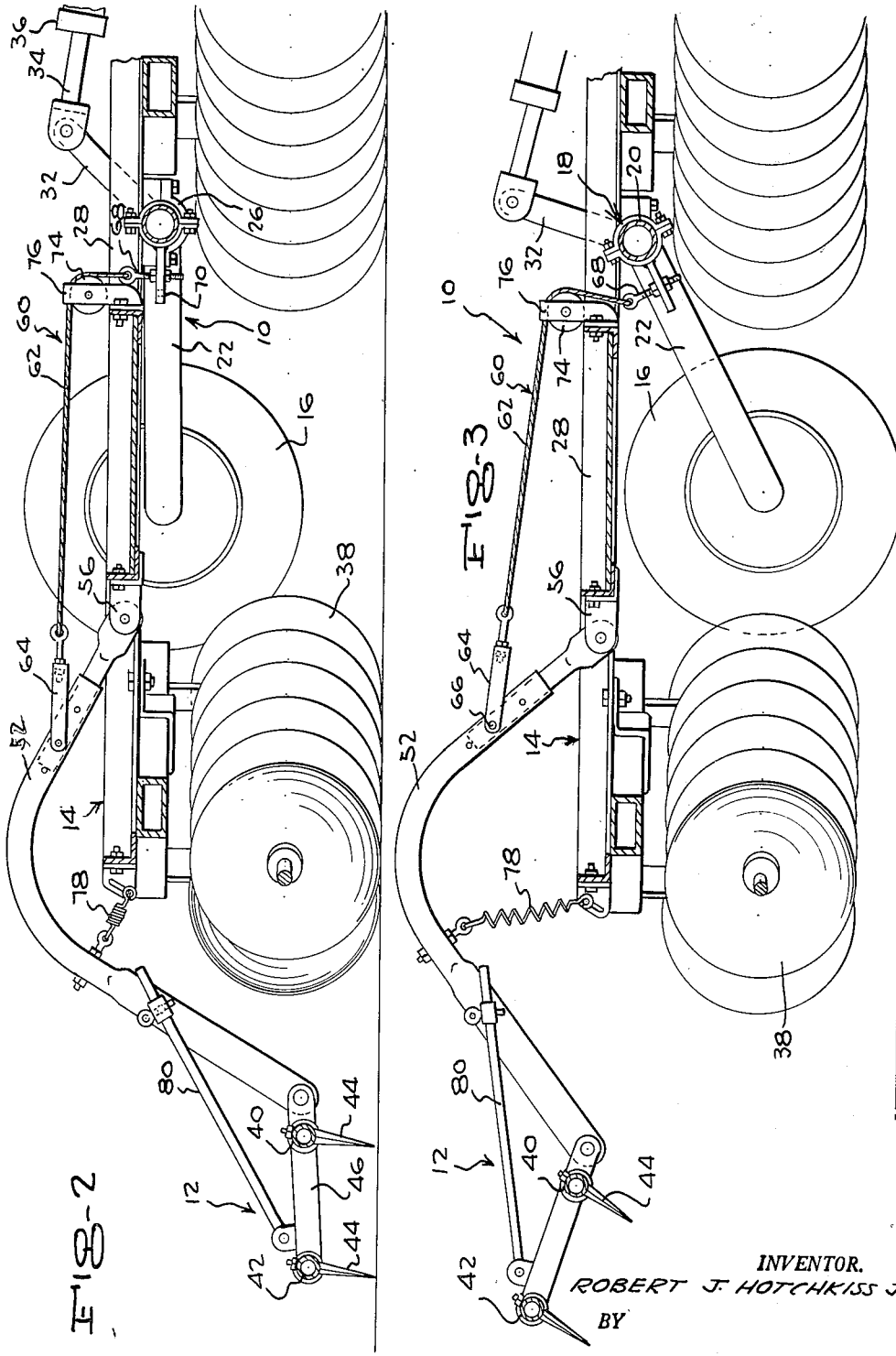

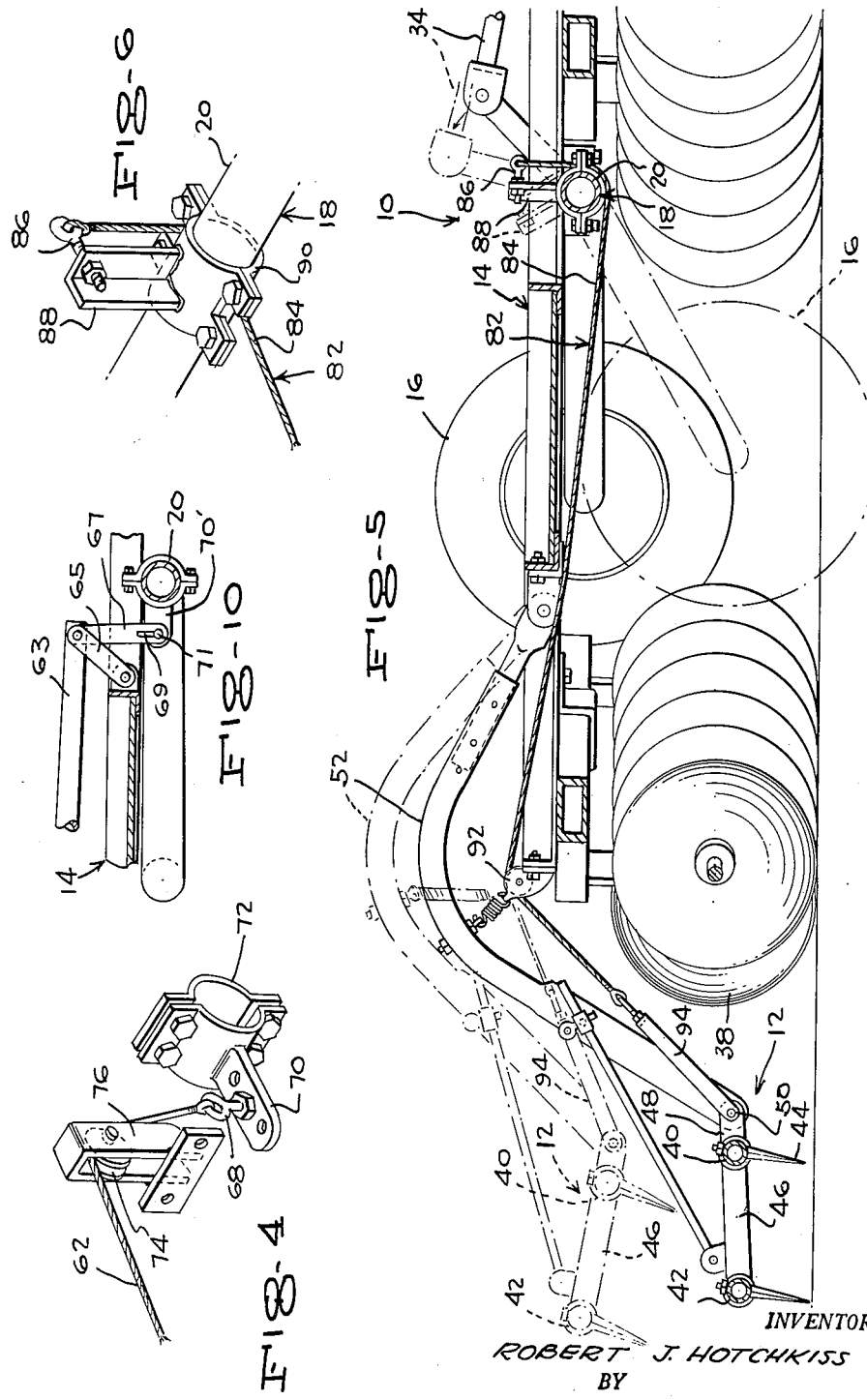

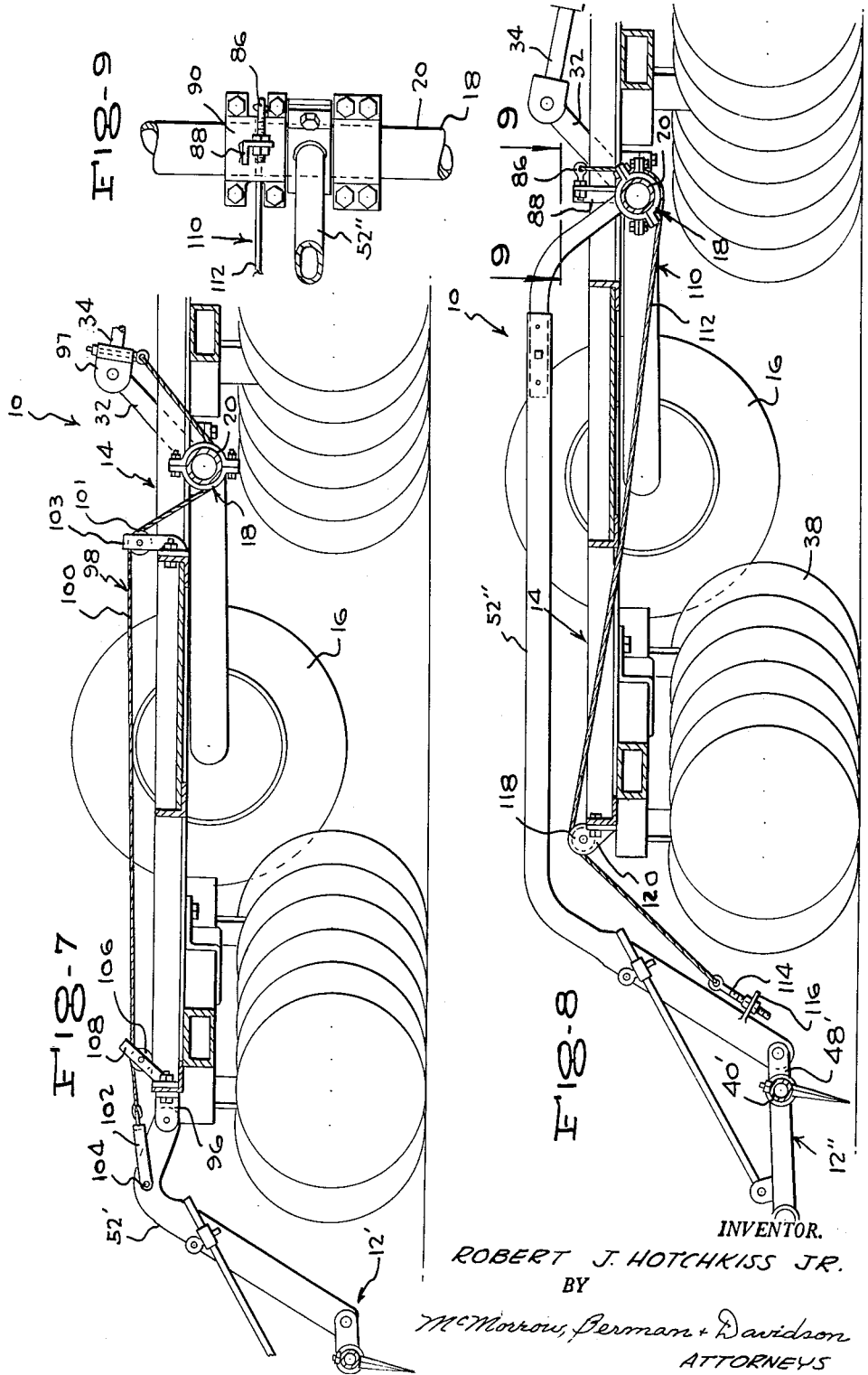

United States Patent Office 3,090,448
Patented May 21, 1963

3,090,448
COMBINATION WHEEL-MOUNTED DISC HARROW AND TOOTH DRAG ATTACHMENT WITH TENSION MEANS THEREFOR
Robert J. Hotchkiss, Jr., % Hotchkiss Steel Products, Bradford, Ill.
Filed Jan. 26, 1960, Ser. No. 4,815
2 Claims. (Cl. 172—178)

The present invention relates to farm implements generally, and in particular to a combination wheel-mounted disc harrow and tooth drag attachment with tension means therefor.

Presently in use are wheel-mounted disc harrows to which are connected tooth drag attachments for trailing movement therebehind while working the soil. Such harrows are provided with a pair of transporting wheels which are normally spaced above the ground surface when the harrow is in the soil working position and which are shiftable to a ground engaging position for travel between fields to be worked or over a roadway. The shifting of the wheels from the normal position above a ground surface to the ground engaging position serves to elevate the harrow out of the soil working position and when the tooth drag attachment is attached to the harrow, the tooth drag attachment is also lifted to the out of soil working position by the overall uplift of the harrow frame-work. Generally, hydraulic power means is employed for shifting the transporting wheels from the normal position to the ground engaging position.

Often the towing vehicle or tractor must traverse ditches between fields to be worked or must travel from a relatively level stretch up a road embankment to the road for travel over the road. When the harrow and drag attachment travel across a ditch, the wheels of the harrow sink into the ditch a distance frequently greater than the normal height of the drag attachment teeth, when elevated in the heretofore conventional manner. In order that the teeth of the drag attachment be kept from gouging into the side of the ditch, it is desirable to have the teeth of the drag attachment as far above the ground surface as possible when the harrow is in the elevated position.

An object of the present invention is to provide a combination wheel-mounted disc harrow and tooth drag attachment with tension means in which the harrow has transport wheels shiftable from a position out of engagement with the soil to a ground engaging position for elevating the harrow, the tooth drag attachment being elevated simultaneously with the harrow, the tension means operating to raise the teeth with respect to the disc harrow.

Another object of the present invention is to provide a combination wheel-mounted disc harrow and tooth drag attachment in which the harrow has transport wheels shiftable between a position out of engagement with the ground and the ground engaging position for elevating the harrow, the tooth drag attachment being elevated with the harrow, and in which the trailing edge of the plane of the tooth points of the drag attachment is raised to a greater extent than the leading edge of such plane, with respect to a plane tangent to the working points of the disc blades.

A further object of the present invention is to provide a combination wheel-mounted disc harrow and tooth drag attachment in which the harrow has transport wheels shiftable between a position out of engagement with the ground and a ground engaging position for elevating the harrow, the tooth drag attachment being elevated with the harrow, with tension means provided and arranged so that there may be substantial independent movement, if desired, of the harrow and the tooth drag attachment.

A still further object of the present invention is to provide a combination wheel-mounted disc harrow and tooth drag attachment with tension means which lends itself to adaptation for use with disc harrows of a broad range of manufacture or construction, one which lends itself to ready attachment to and detachment from a disc harrow, and one which is highly effective in action.

Yet another object of the present invention is to provide a combination wheel-mounted disc harrow and tooth drag attachment with tension means which is sturdy in construction, one simple in structure, one economical to manufacture and assemble, and one which lends itself to universal use with a broad range of disc harrows and a broad range of tooth drag attachments.

These and other objects and advantages of the present invention will be fully apparent from the following description when taken in conjunction with the annexed drawings, in which:

FIGURE 2 is a side elevational view of the assembly shown in FIGURE 1 with the wheels in the normal elevated position;

FIGURE 3 is a view of the assemblies shown in FIGURES 1 and 2 with the wheels in the ground engaging position;

FIGURE 4 is an isometric view of a portion of the tension means according to the present invention;

FIGURE 5 is a side elevational view similar to FIGURE 2, showing the tension means according to another embodiment, the drag attachment being shown in dotted lines in the partially elevated position;

FIGURE 6 is a fragmentary isometric view of the tension means employed in the assembly shown in FIGURE 5;

FIGURE 7 is a side elevational view of another application of the tension means, showing one end of the cable attached to the hydraulic cylinder actuating arm;

FIGURE 8 is a side elevational view of the tension means as employed with a still further type of tooth drag attachment;

FIGURE 9 is a view on an enlarged scale, taken on the line 9—9 of FIGURE 8; and

FIGURE 10 is a fragmentary elevational view, partly in section, of a rigid linkage-type tension means connecting the attachment and the wheels.

Figure 1:
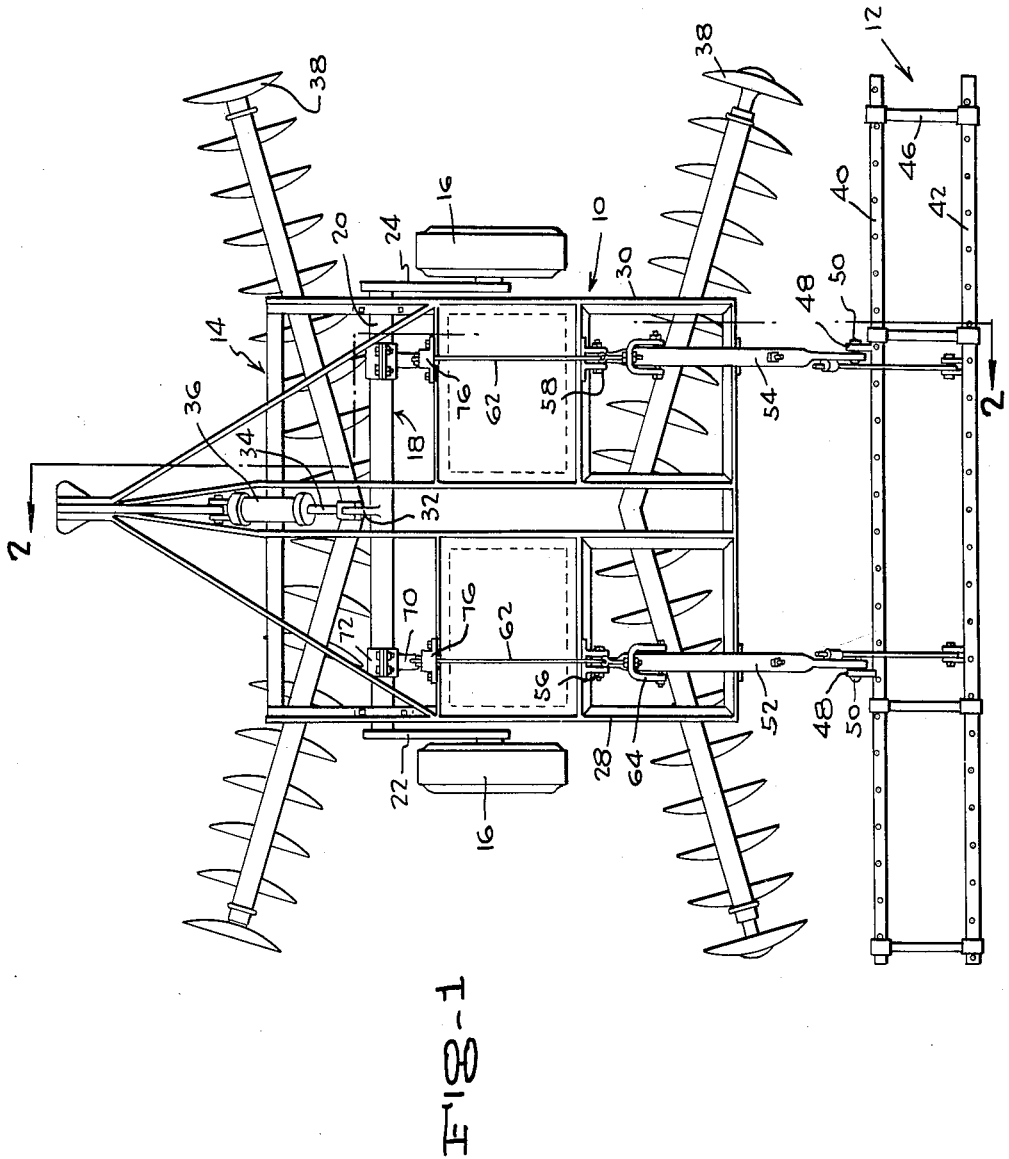
FIGURE 1 is a top plan view of the combination wheel-mounted disc harrow and tooth drag attachment with the tension means of the present invention installed thereon.

Referring in greater detail to the drawings in which like numerals indicate like parts throughout the several views, in FIGURES 1 to 3, a disc harrow is designated generally by the reference numeral 10 and a tooth drag attachment by the numeral 12. The harrow 10 includes a frame 14 having a forward end and a rearward end. A pair of transporting wheels 16 are positioned transversely of the frame 14 between the forward and rearward ends thereof with the wheels 16 normally spaced above a ground surface.

Means is provided connecting the wheels 16 to the frame 14 for movement from the normal position out of engagement with the ground surface to a transporting position in engagement with the ground surface. Specifically, this means consists in a U-shaped wheel-carrying element 18 having a bight 20 and legs 22 and 24 projecting from the ends of the bight 20.

The bight 20 of the element 18 is journaled in trunnions 26 on the frame side pieces 28 and 30.

An arm 32 projects upwardly from the mid-part of the bight 20 of the element 18 and the upper end of the arm 32 is pivotally connected to the free end of the actuating arm 34 of a hydraulic cylinder assembly 36.

The hydraulic cylinder assembly 36 has the end opposite the arm 34 supported upon the forward end of the frame 14. Upon actuation of the hydraulic cylinder assembly 36, the wheels 16 are shifted from the elevated position in FIGURE 2 to the ground engaging position in FIGURE 3, resulting in the lifting of the harrow 10 to a position in which the discs 38 thereof are out of engagement with the ground surface.

The tooth drag attachment 12 is positioned transversely of the frame 14 and rearwardly of the rearward end of the frame 14. The attachment 12 includes a tooth unit including at least front and rear tooth-carrying bars 40 and 42 arranged in tandem spaced relation. Each of the bars 40 and 42 has a plurality of teeth 44 arranged in spaced relation therealong and carried thereby. Laterally spaced connectors 46 connect the bars 40 and 42 together.

Ears 48 project forwardly from the bar 40 at points spaced inwardly from the ends thereof and a pivot pin 50 is carried by each of the ears 48.

The attachment 12 includes a pair of laterally spaced drawbars 52 and 54 constituting lift support means, each having its forward end pivotally connected to a bracket 56, 58 respectively, projecting rearwardly from the mid-part of the frame 14.

The rearward end of each of the drawbars 52 and 54 is pivotally connected by the pin 50 to the ear 48 on the adjacent part of the attachment 12.

Tension means, FIGURES 2 and 3, and indicated by the reference numeral 60 is provided which connects the attachment 12 and the wheels 16 so that upon movement of the wheels 16 from the normal elevated position to the transporting position and in engagement with a ground surface, the tooth drag attachment 12 will be raised with respect to the ground surface. With the raising of the tooth drag attachment, the teeth 44 of the trailing tooth-carrying bar 42 are at a higher level with respect to the ground surface than the teeth 44 of the leading tooth-carrying bar 40, or the trailing edge of the plane of the points of the teeth 44 of the attachment is raised with respect to a plane tangent to the working portions of the disc blades 38. Specifically, this tension means 60 is of the type employing a cable and consists in a cable 62 connecting each of the drawbars 52 and 54 to the bight 20. As the tension means 60 for each of the drawbars 52 and 54 is identical, it will be described with reference to the means associated with the drawbar 52.

A yoke 64, on one end of the cable 62, is connected by a pin 66 to the portion of the drawbar 52 rearwardly of and adjacent the pivotal connection of the drawbar 52 to the bracket 56. The other end of the cable 62 is connected to an eye bolt 68 which has its shank threadedly and adjustably secured in a post or crank arm 70 which projects from an adjustable clamping sleeve 72 circumposed about the bight 20 of the element 18. An intermediate portion of the cable 62 travels over a pulley 74 rotatably supported in a standard 76 which projects upwardly from another mid-part of the frame 14 and is secured thereto. The standard 76 and sleeve 72 are shown most clearly in FIGURE 4.

Snubbing means, embodying a coil spring 78, has one end connected to an intermediate portion of each of the drawbars 52 and 54 and has its other end connected to the rearward part of the frame 14. The spring 78 applies tension to the drawbar to take up any slack in the cable 62 and prevents inverting of the drag attachment 12 if the tractor or towing vehicle should traverse unusually rough ground and cause the drag attachment 12 to oscillate violently upwardly and downwardly to a point where it would be overthrown over the harrow frame 14 unless restrained. It is to be noted that the snubbing means or coil spring 78 lies substantially co-extensive with the harrow frame 14 in the normal position of the transporting wheels 16 and becomes activated to yieldingly restrain upward movement of the drawbars 52 and 54 when the wheels 16 are moved to the transporting position.

Adjustable brace means or an adjustment rod 80 connects the rearmost or trailing tooth-carrying bar 42 to the drawbars 52 and 54 inwardly of the rearward ends of the latter for maintaining the tooth unit in fixed relation to the other ends of the drawbars 52 and 54.

With reference to FIGURE 5, the disc harrow 10 and tooth drag attachment 12 are shown with a modified form of the tension means according to the present invention, the means being designated generally by the reference numeral 82. In this form of the invention, one end of a cable 84 extends under the bight 20 of the wheel-carrying element 18 inwardly of each end of the latter. The cable 84 is fastened to an eye bolt 86 having its shank adjustably mounted in one leg of an upstanding angle member 88 which has its lower end secured by welding or other means to a half-portion of a second adjustable sleeve 90.

A portion of the cable 84 inwardly of the other end travels over a pulley mounted in a bracket 92 carried on the rearward end portion of the frame 14. The adjacent end portion of the cable 84 is secured to a yoke 94 pivotally connected to the pin 50 which is carried by the adjacent ear 48 projecting forwardly from the adjacent tooth-carrying bar 40.

In FIGURE 7, the harrow 10, previously described, is shown in use with a tooth drag attachment 12' having altered drawbars. One of the drawbars is shown and is designated by the reference numeral 52'.

The drawbar 52' has its forward end pivotally connected to an ear 96 projecting from the rearward portion of the frame 14. The other end of the drawbar 52' is pivotally connected to the drag attachment 12', as heretofore described with reference to the attachment 12.

The tension means of the present invention is designated generally by the reference numeral 98 and includes a cable 100 having one end connected to a yoke 97 on the free end of the hydraulic cylinder actuating arm 34. The arm 34 is also connected to the free end of the arm 32 as previously described with reference to FIGURES 1 to 3.

The other end of the cable 100 is connected to a yoke 102 which is pivotally connected by the pin 104 to the drawbar 52' at a point spaced inwardly from the pivotal connection of the drawbar 52' with the ear 96.

A mid-part of the cable 100 travels over a pulley 106 mounted in a U-shaped bracket 108 carried on the rearward portion of the frame 14 forwardly of the ear 96.

The means for rotating the bight 20 of the wheel-carrying element 18 for lowering the wheels 16 is the same as described with reference to the tension means 60, as shown in FIGURES 1 to 4, inclusive.

In FIGURE 8, the disc harrow 10 is shown in association with a tooth drag attachment 12" having altered drawbars connecting the same to the harrow 10. The drawbars in this case extend from the attachment 12" to the wheel-carrying element 18, one of such drawbars being shown and designated by the numeral 52".

The tension means, in this form of the invention, is designated generally by the reference numeral 110 and comprises a cable 112 having one end fastened to the eye bolt 86, previously described with reference to the clamping sleeve 90, and shown in FIGURES 5 and 6.

The other end of the cable 112 is secured to another eye bolt 114 having its shank adjustably secured in a plate element 116 which projects forwardly from the portion of the drawbar 52" adjacent to the pivotal connection of the drawbar 52" with the ear 48' on the foremost or leading tooth-carrying bar 40'. A midportion of the cable 112 travels over a pulley 118 mounted in a bracket 120 secured to the rearward part of the frame 14.

In operation of the tension means 60, as shown in FIGURES 1 to 4, inclusive, rotation of the bight 20 in the counterclockwise direction effects the swinging movement of the arm or post 70 and applies tension to the cable 62 so as to raise the tooth drag attachment 12 from the position shown in FIGURE 2 to the position shown in FIGURE 3, in which teeth 44 of the trailing tooth-carrying bar 42 are at a level higher than the teeth 44 on the leading tooth-carrying bar 40, or, in other words, the trailing edge of the plane of the points of the teeth 44 of the attachment is raised with respect to a plane tangent to the working portions of the disc blades 38. The snubbing means or spring 78 maintains tension on the cable 62 and prevents inadvertent movement of the drag attachment 12 over the frame 14.

Upon admission of hydraulic fluid into the other end of the cylinder of the assembly 36, the actuating arm 34 is retracted and the wheels 16 raised above the ground surface, resulting in lowering of the drag attachment 12 and the disc 38 into the ground working position.

The same action takes place with the tension means 82, shown in FIGURE 5. Actuation of the hydraulic cylinder assembly to shift the actuating arm 34 from the full line position to the dotted line position results in rotation of the bight 20 in the counterclockwise direction which applies tension on the cable 84 to pull the yoke 94 upwardly from the full line position to the dotted line position, effecting raising of the drag attachment 12 in the manner similar to that as above described with reference to the tension means 60.

The action is the same for both of the tension means 98 and 110 in FIGURES 7 and 8, respectively. In each case, tension upon the cable 100, 112, results in pulling upwardly of the drag attachment 12', 12", with the intermediate portion of the cable 100 traveling over the pulley 106 and the intermediate portion of the cable 12 traveling over the pulley 118.

In place of the tension means 60, 82, and 98, including a cable, as above described, a tension means of the rigid linkage type, as depicted in FIGURE 10, may be employed. Specifically, the rigid linkage tension means of FIGURE 10 comprises a rigid link member 63 which has one end, not shown, connected to the attachment 12, either to the drawbars 52 and 54 intermediate the ends thereof, or the two tooth-carrying bars of the attachment. The other end of the link member 63 is operatively connected to the wheels 16, as by having the other end of the link member 63 pivotally connected to one end of an arm 65 which is pivoted to the frame 14. A link element 67 is pivotally connected at one end to the pivotal connection of the rigid link member 63 to the arm 65, the other end of the link element 67 being connected by a lost-motion connection, namely, a pin 71 projecting slidably through an elongated closed slot 69 formed in the link element 67 adjacent the other end thereof. The pin 71 is carried by the post 70' which is fixedly secured to the bight 20 of the wheel-carrying element. Upon execution of the movement of the wheels 16 from the normal position to the transporting position, the drag attachment 12 will be raised with respect to the disc harrow 10. By virtue of the lost-motion connection above described, compressive forces are prevented from being applied to the linkage when the wheels are in the transporting position and the attachment travels over undulating terrain.

In each form of the invention, when the wheels 16 are moved to the ground engaging position, the tooth drag attachment is raised above the ground surface with the raising of the teeth 44 of the trailing tooth-carrying bar 42 to a higher level with respect to the ground surface than the teeth 44 of the leading tooth-carrying bar 40, or,
the trailing edge of the plane of the points of the teeth 44 of the attachment is raised with respect to a plane tangent to the working positions of the disc blades 38.

This has the advantage that should the wheels 16 roll into a ditch, the teeth of the tooth drag attachment will be free from engagement with the ground surface.

What is claimed is:

1. The combination with a disc harrow including a frame having a forward end and a rearward end, a pair of transporting wheels positioned transversely of said frame between the forward and rearward ends thereof and normally spaced above a ground surface, a wheel-carrying element connecting said wheels together, means rotatively connecting said element to said frame about a transverse horizontal axis for pivotal movement of said wheels from the normal position to a position in which said wheels are in a transporting position on said ground surface, and means operatively connected to said element for effecting the movement of said wheels from the normal position to the transporting position, to a tooth drag attachment including at least two drawbars and a tooth unit including at least front and rear tooth-carrying bars each having a plurality of teeth arranged in spaced relation therealong and depending therefrom, said tooth unit being disposed rearwardly of the rearward end of said frame with the drawbars disposed so as to extend over the frame and having one of the complemental ends adjacent said frame and having the other of the complemental ends adjacent said tooth unit, means connecting said one complemental ends of said drawbars to said frame for pivotal movement about a horizontal axis parallel to said horizontal axis of said wheel-carrying element, means pivotally connecting said other complemental ends of said drawbars to the front tooth-carrying bar of said tooth unit, adjustable brace means interconnecting each drawbar to the rear tooth-carrying bar to maintain the tooth unit in fixed relation to said other complemental ends of said drawbars, snubbing means connecting the rearward end of said frame to said drawbar and lying substantially coextensive with said frame in the normal position of said wheels and becoming activated to yieldingly restrain upward movement of said drawbars when said wheels are moved to transporting position, at least one crank arm fixedly secured to said wheel-carrying element, and tension means connected at one end to said crank arm and connected at its other end to said drawbars whereby said drawbars in the course of movement of the wheels from the normal position to the transporting position will elevate said tooth unit with respect to said harrow.

2. The combination according to claim 1 wherein at least one pulley is mounted on said frame and said tension means passes over said pulley.

References Cited in the file of this patent
UNITED STATES PATENTS

| | | |
|---|---|---|
| 245,456 | Deniston | Aug. 9, 1881 |
| 328,898 | Lyons | Oct. 20, 1885 |
| 445,507 | Okey | Jan. 27, 1891 |
| 705,337 | Gatling | July 22, 1902 |
| 916,184 | Newcomer | Mar. 23, 1909 |
| 1,626,572 | Wiese | Apr. 26, 1927 |
| 2,765,609 | Oehler et al. | Oct. 9, 1956 |
| 2,786,285 | Lindbeck | Mar. 26, 1957 |
| 2,881,578 | Oehler et al. | Apr. 14, 1959 |